(12) United States Patent
Cho et al.

(10) Patent No.: US 8,109,351 B2
(45) Date of Patent: Feb. 7, 2012

(54) MULTI-LINK BRIDGE IN UNDERCARRIAGE SYSTEM

(75) Inventors: Joon-il Cho, Busan (KR); Jin-gyu Seon, Busan (KR); Dong-hwa Park, Busan (KR)

(73) Assignee: Dong-Il Runner Belt Co., Ltd., Busan (KR)

( * ) Notice: Subject to any disclaimer, the term of this patent is extended or adjusted under 35 U.S.C. 154(b) by 539 days.

(21) Appl. No.: 12/294,830

(22) PCT Filed: Apr. 4, 2007

(86) PCT No.: PCT/KR2007/001642
§ 371 (c)(1),
(2), (4) Date: Nov. 25, 2008

(87) PCT Pub. No.: WO2007/114644
PCT Pub. Date: Oct. 11, 2007

(65) Prior Publication Data
US 2011/0036649 A1    Feb. 17, 2011

(30) Foreign Application Priority Data

Apr. 5, 2006   (KR) .......................... 10-2006-0030910

(51) Int. Cl.
*B62D 55/10* (2006.01)
(52) U.S. Cl. ........................................................ 180/9.5

(58) Field of Classification Search .................. 180/9.5, 180/9.52, 9.54
See application file for complete search history.

(56) References Cited

U.S. PATENT DOCUMENTS 6,378,635 B1 *   4/2002   Yoshida et al. ................ 180/9.5

FOREIGN PATENT DOCUMENTS

| JP | 03-143888 | 6/1991 |
| JP | 07-096869 | 4/1995 |
| JP | 08-226141 | 9/1996 |
| KR | 1998-0037445 | 9/1998 |

* cited by examiner

*Primary Examiner* — Kevin Hurley
(74) *Attorney, Agent, or Firm* — Swanson & Bratschun, L.L.C.

(57) ABSTRACT

The present invention employs a multi-link to an excavator for the first, and restricts a relative movement of the center frame (10) and the roller frame (20) using a multi-link bridge (30) in relation to an undercarriage system of vehicle body structures of the excavator. According to the present invention, in an undercarriage system in which the center frame 10 and the roller frame 20 are independently from each other, a plurality of links is added to rotate up and down by a predetermined angle in a vertical direction and a longitudinal direction of the roller frame (20) and thus the overturning can be prevented and also operator's feeling of riding can be enhanced by preventing an inclination of the center frame (10) due to condition of an uneven road surface, and a service life of the track can be increased as the partial wear is prevented.

5 Claims, 4 Drawing Sheets

[Fig. 1]
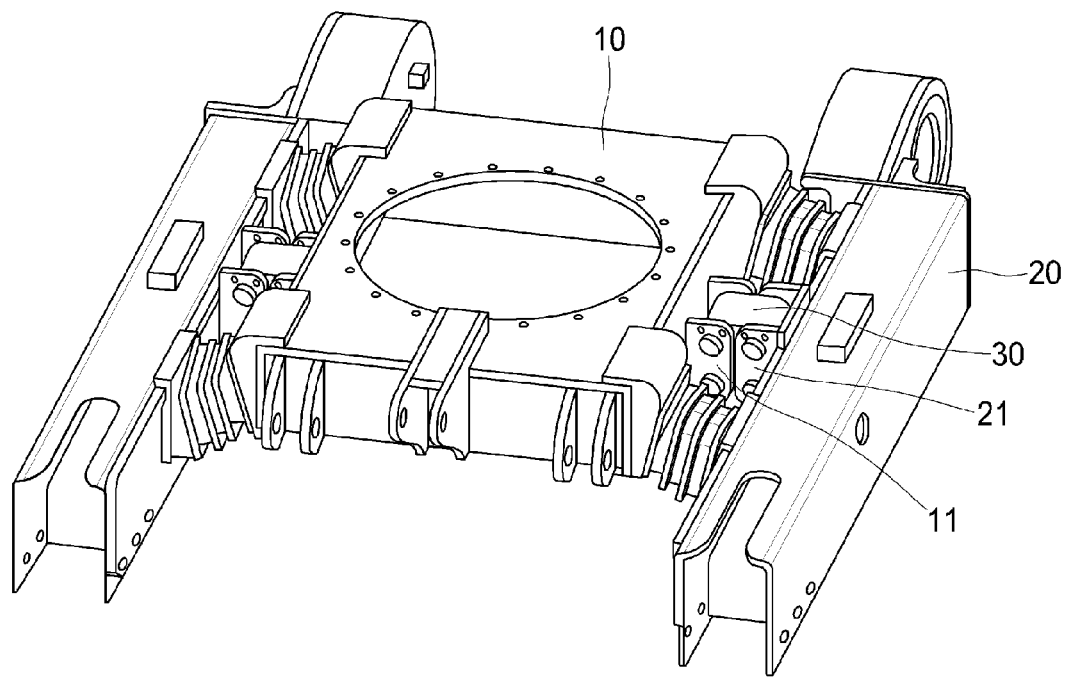
[Fig. 2]
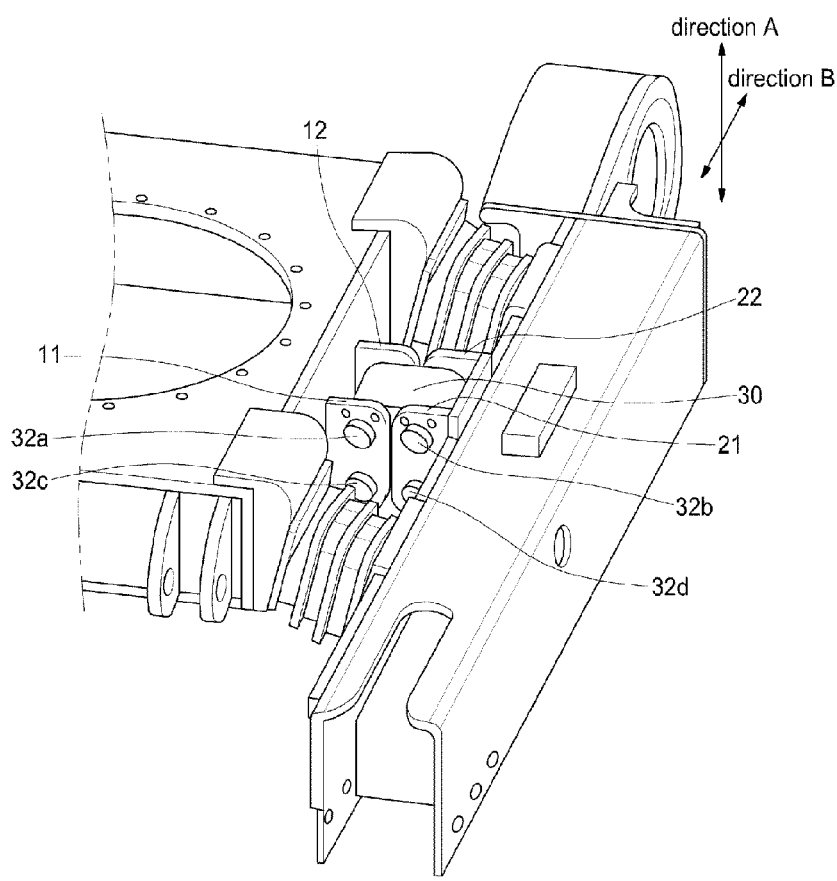

[Fig. 3]
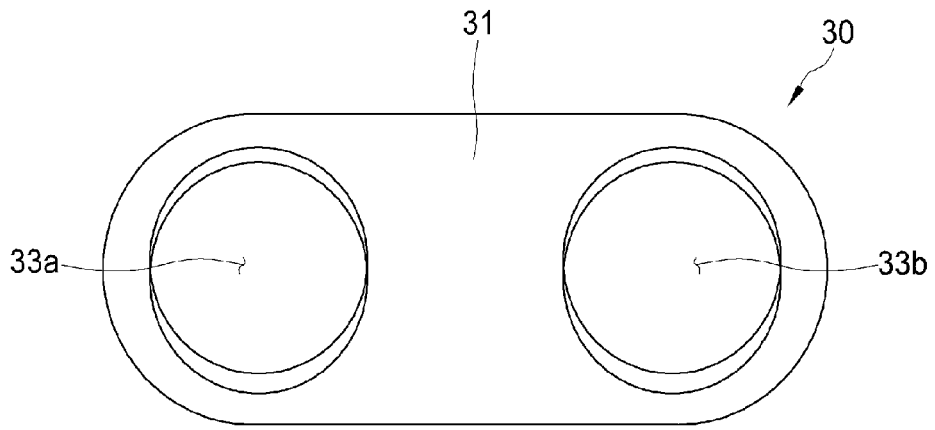
[Fig. 4]
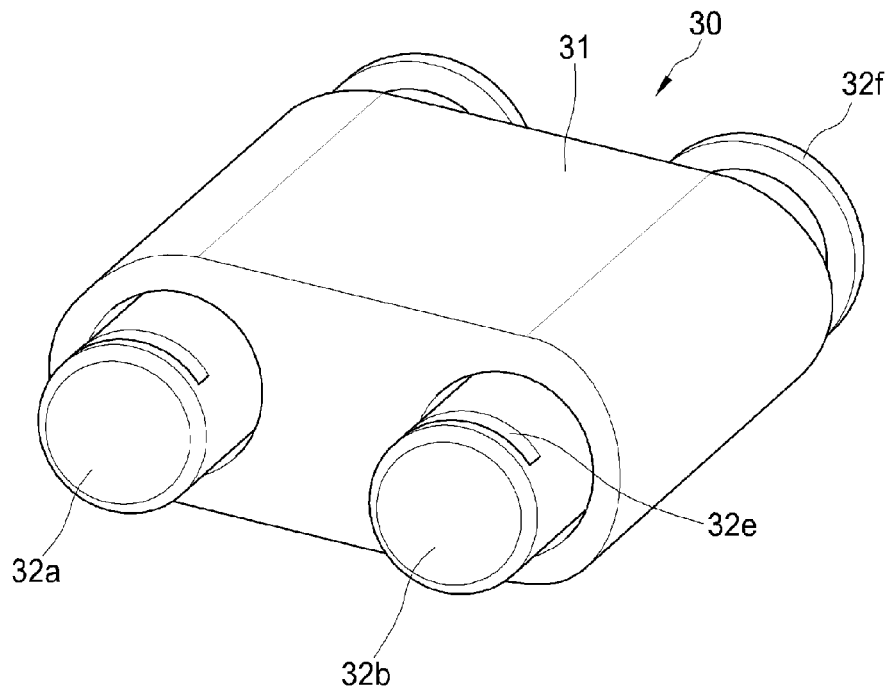
[Fig. 5]
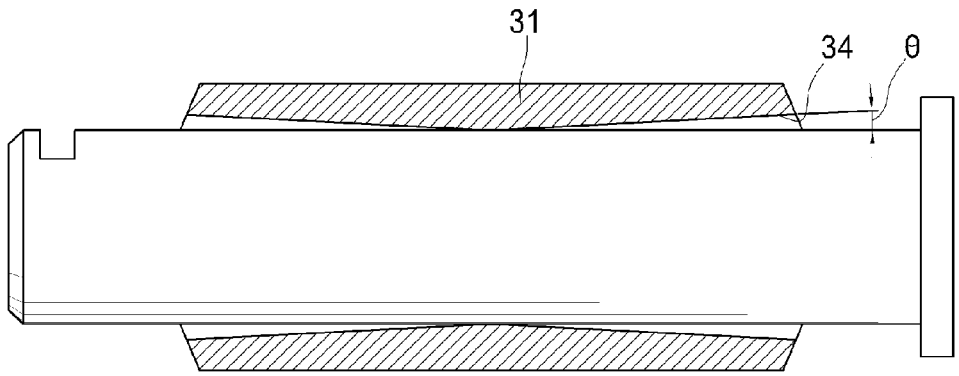

[Fig. 6]
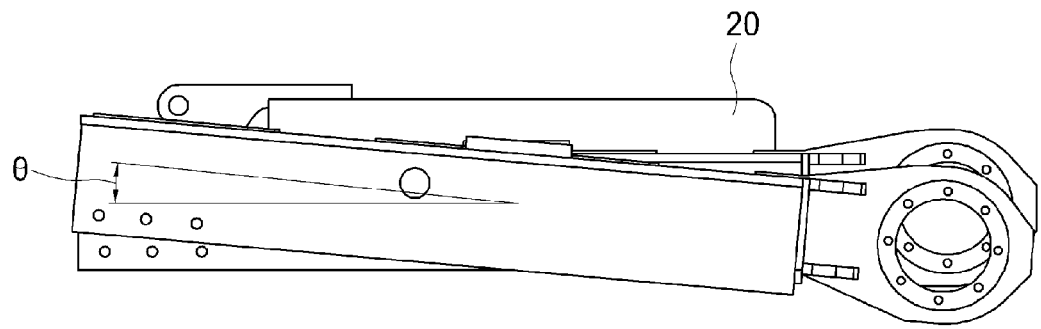
[Fig. 7]
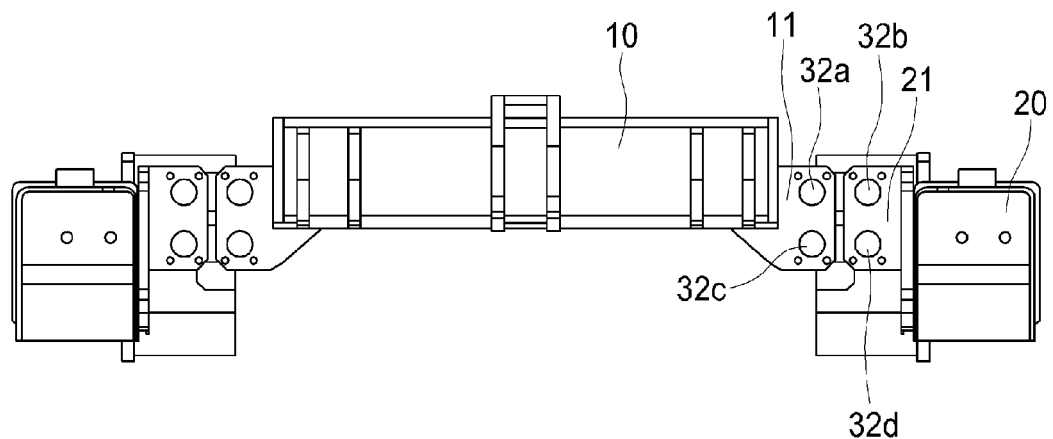
[Fig. 8]
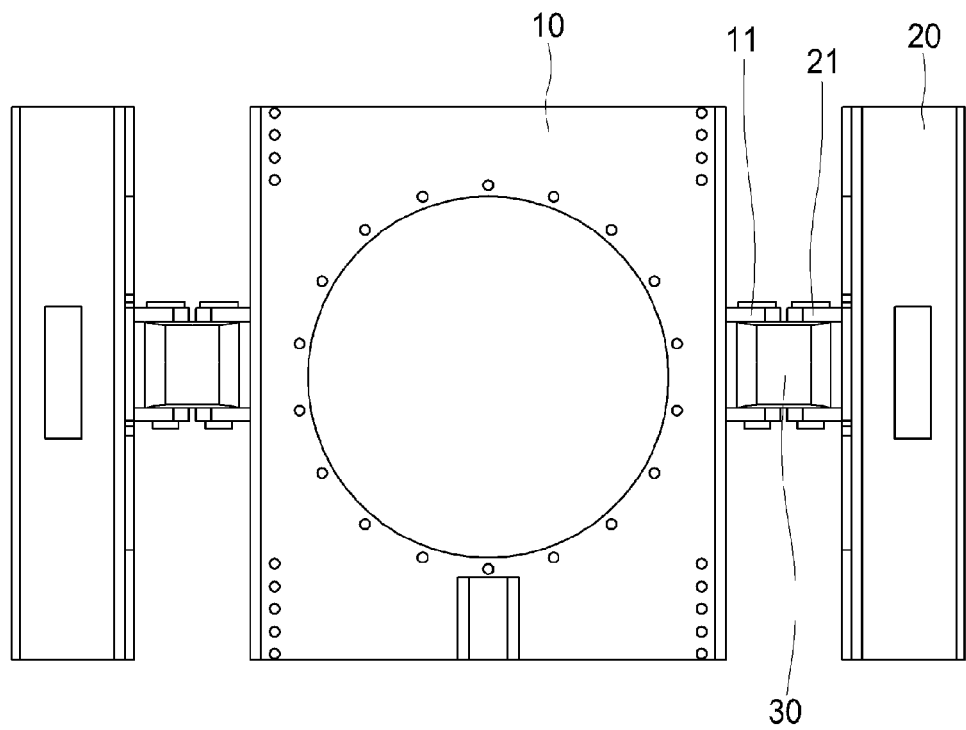

[Fig. 9]
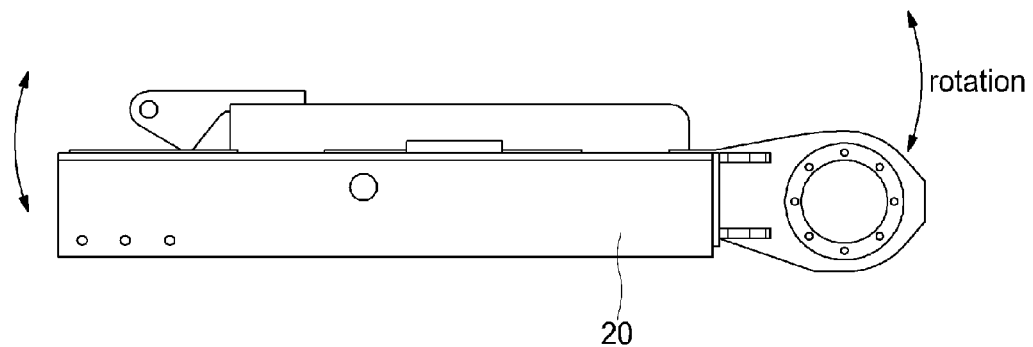
[Fig. 10]
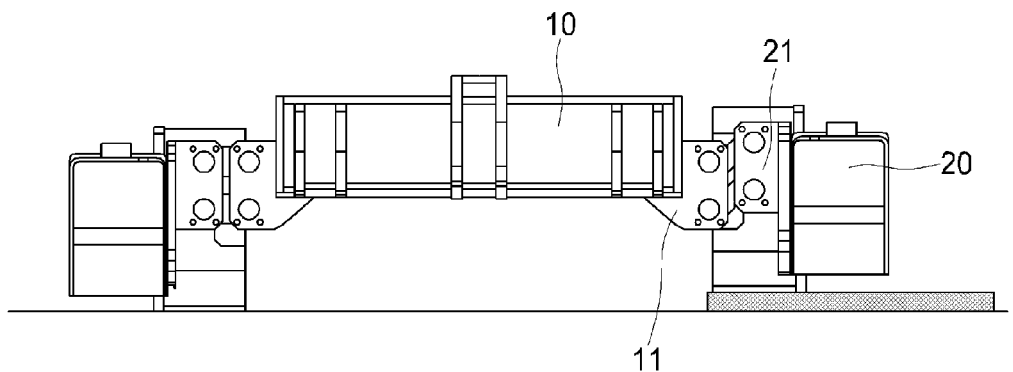
[Fig. 11]
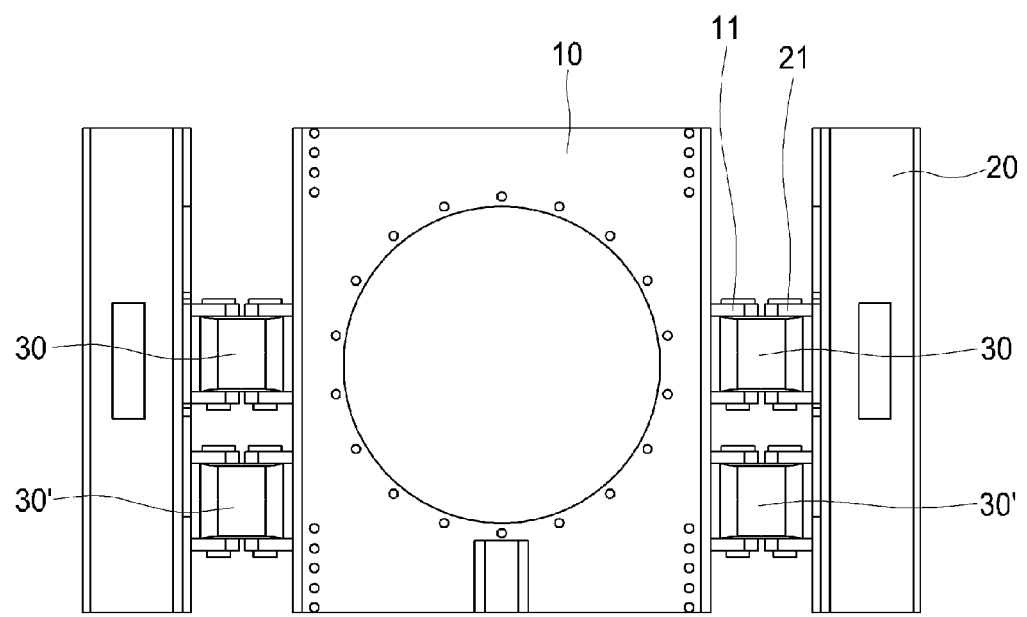

MULTI-LINK BRIDGE IN UNDERCARRIAGE SYSTEM

RELATED APPLICATIONS

This application is a 35 U.S.C. §371 national phase application of PCT/KR2007/001642 (WO 2007/114644), filed on Apr. 4, 2007, entitled "Multi-Link Bridge In Undercarriage System," which application claims the benefit of KR 10-2006-0030910, filed on Apr. 5, 2006. Each of these applications is specifically incorporated herein by reference in its entirety.

TECHNICAL FIELD

The present invention relates to an undercarriage system, and more particularly, to a multi-link bridge in an undercarriage system, capable of preventing effectively an inclination of a roller frame in a vertical direction occurred from a load of a vehicle body and a condition of an uneven road surface and thus preventing an overturning of an excavator and a partial wear of a track thereby enhancing a service life and a feeling of riding by designing a center frame and the roller frame in an independent shape and connecting the center frame and the roller frame in an independent shape by the multi-link bridge so that both frame are independently movable in an up and down direction and a front and rear direction.

BACKGROUND ART

Generally, an undercarriage system, with a shape in which a center frame and a roller frame are connected to each other, of conventional excavators have had problems that if there are uneven road surfaces in a work place, an inclination of an overall excavator is occurred as the center frame and the roller frame are inclined simultaneously according to a condition of the uneven road surfaces and thus there are a dangerousness due to an overturning of a vehicle body, a decrease of a durability due to an accompanying partial wear by a load of a vehicle body and a decrease of a feeling of riding.

DISCLOSURE OF INVENTION

Technical Problem

It is an object of the present invention, to solve the above problems, to provide a multi-link bridge in an undercarriage system capable of preventing a vibration and an inclination of a vehicle body occurred by a condition of an uneven road surface thereby enhancing operator's feeling of riding as well as preventing an overturning and capable of preventing a partial wear of a track thereby enhancing a durability by designing a center frame and a roller frame independently from each other and adding a plurality of links to the frame connecting portion so that the roller frame is relatively movable independently from the center frame in a up and down direction and a front and rear direction respectively.

Technical Solution

To achieve the object of the invention, the present invention provides a multi-link bridge in an undercarriage system including a center frame and a roller frame of the undercarriage system which are designed independently from each other; link connection brackets installed respectively at opposite side surfaces of the center frame and the roller frame; and a link bridge coupled to the link connection brackets, for connecting the center frame and the roller frame, wherein the movement of the roller frame is independently from the center frame in an up and down or vertical direction and a front and rear or longitudinal direction.

The link connection brackets may be installed in pairs with a predetermined distance on the opposite side surfaces of the center frame and the roller frame, and at least one pin hole for inserting a connection pin may be formed at the corresponding position.

In the multi-link bridge in an undercarriage system according to another aspect of the present invention, a plurality of the pin holes are formed with a predetermined distance at upper and lower portion of the each link connection bracket and a plurality of the link bridges is coupled in a laminated structure to each pin hole of the link connection bracket, thereby coupling the center frame and the roller frame in duplicate.

In the multi-link bridge in an undercarriage system according to each embodiment of the present invention, the link bridge may be provided with a link housing having a body of which both side surfaces adjoining the center frame and the roller frame are shaped in curved surface and two coupling holes which are formed in an inside of the body so as to pass through the body in parallel to each other and contain the connection pin for connecting to the center frame and the roller frame; and the link connection pins which are formed with a diameter enough to be inserted into the coupling holes of the link housing and rotatably couple each of the link connection brackets of the center frame and the roller frame to each of the coupling holes of the link housing, and the coupling hole may be formed with an inclined surface having a predetermined angle from a center portion of the housing of the link bridge toward an outside at an inner peripheral surface thereof, thereby enabling the roller frame connected to the center frame to rotates along the longitudinal direction of the frame by the inclined surface.

The present invention also provides a multi-link bridge in an undercarriage system, in which a center frame and roller frames of the undercarriage system are connected by a plurality of link bridges, the link bridge is provided with a link housing having a body of which both side surfaces opposite the center frame and the roller frame are shaped in curved surface and coupling holes which are formed to pass through the body so as to contain a connection pin and the link connection pin coupled to the coupling hole of the link housing, and an inclined surface having a predetermined angle along a longitudinal direction of the coupling hole from a center portion of the housing of the link bridge toward an outside is formed at an inner peripheral surface of the coupling hole, thereby enabling the roller frame to rotate in a vertical direction and up and down along the longitudinal direction.

BRIEF DESCRIPTION OF THE DRAWINGS

The above and other objects, features and advantages of the present invention will become apparent from the following description of preferred embodiments given in conjunction with the accompanying drawings, in which:

FIG. 1 is a perspective view illustrating an entire undercarriage system employing a multi-link bridge according to a preferred embodiment of the present invention;

FIG. 2 is an enlarged perspective view illustrating a connecting portion which connects a center frame and a roller frame of FIG. 1;

FIGS. 3 to 5 are detailed views illustrating selected parts of the multi-link bridge in the undercarriage system according to the present invention;

FIG. 6 is an operation state view illustrating a rotation operation of the roller frame in a front and rear direction or longitudinal direction by the multi-link bridge;

FIGS. 7 to 10 are a front view, a plan view, a side view and an operation state view illustrating a movement direction and rotation locking state of the roller frame in the undercarriage system according to the present invention; and FIG. 11 is a plan view illustrating an undercarriage system according to another feature of the invention.

BEST MODE FOR CARRYING OUT THE INVENTION

Practical and presently preferred embodiments of the present invention are illustrative as shown in the following Examples. A pigment mixed in melted resin is exemplary a flake type pigment in the present description; however it will be appreciated that besides the flake type a polyhedron type pigment or a different type of pigment may also be employed.

FIG. 1 is a perspective view illustrating an entire undercarriage system employing a multi-link bridge according to a preferred embodiment of the present invention and FIG. 2 is an enlarged perspective view illustrating a structure of a connecting portion which connects a center frame and a roller frame of FIG. 1; shown is a state that two multi-link bridges 30 are coupled in a laminated structure to link connection brackets 11, 12, 21 and 22 so as to couple the center frame 10 and the roller frame 20 in duplicate, and shown is the undercarriage system in which a movement of the roller frame 20 is, as shown in FIG. 2, independently from the center frame 10 in an up and down or vertical direction (direction A) and a front and rear or longitudinal direction (direction B) respectively.

As shown in the drawings, a preferred embodiment of the present invention includes the center frame 10 and the roller frame 20 of the undercarriage system which are designed independently from each other, link connection brackets 11, 12, 21 and 22 attached to opposite side surfaces of the center frame 10 and the roller frame 20 respectively, and a multi-link bridge 30 coupled to the link connection brackets 11, 12, 21 and 22, for connecting the center frame 10 and the roller frame 20 so as to enable a rotation movement in the vertical direction or the longitudinal direction.

The link connection brackets 11, 12, 21 and 22 are at a predetermined distance from each other, attached in pairs to each opposite side surface of the center frame and the roller frame respectively and formed with a plurality of pin holes for inserting a connection pin.

FIGS. 3 to 5 are detailed views illustrating selected parts of the multi-link bridge in the undercarriage system according to the present invention and FIG. 6 is an operation state view illustrating a rotation operation of the roller frame in the longitudinal direction by the multi-link bridge. The link bridge 30 includes a link housing 31 having a body of which both side surfaces adjoining the center frame 10 and the roller frame 20 are shaped in curved surface and two coupling holes 33a and 33b which are formed in an inside of the body so as to pass through the body in parallel to each other and contain the connection pin for connecting to the center frame 10 and the roller frame 20, and the link connection pins 32a to 32d which are formed with a diameter enough to be inserted into the coupling holes 33a and 33b of the link housing 31 and rotatably couple each of the link connection brackets 11, 12, 21 and 22 of the center frame 10 and the roller frame 20 to each of the coupling holes 33a and 33b of the link housing 31.

As shown in FIG. 5, an inclined surface 34 having a predetermined angle θ, preferably, greater than 0° and less than or equal to 30°, is formed in an inner peripheral surface of the coupling holes 33a and 33b along the longitudinal direction from a center portion of the housing 31 of the multi-link bridge 30 toward an outside and thereby enabling the roller frame 20 connected to the center frame 10 to rotate, as shown in FIG. 6, with a space of the predetermined angle θ to both upside and downside along the longitudinal direction of the frame (direction B in FIG. 2) by the inclined surface 34.

In other words, the center frame 10 and the roller frame 20 of the present invention include the multi-link bridge 30 as shown in FIGS. 1 and 2 and the multi-link bridge 30 is inserted between the pair of link connection brackets 11 and 12 which are attached to the side surface of the center frame 10 and the pair of link connection brackets 21 and 22 which are attached to the side surface of the roller frame 20, and the link connection brackets 11, 12, 21 and 22 and the multi-link bridge 30 are coupled by the plurality of the link connection pins 32a to 32d so as to accomplish coupling of the center frame 10 and the roller frame 20. In such the structure, the center frame 10 and the roller frame 20 interconnected by the multi-link bridge 30 are movable in the up and down direction independently from each other but are restricted to move in the lateral direction.

In the link housing 31 constructing the body of the multi-link bridge 30, as shown in FIGS. 3 to 5, both side surface thereof are shaped in a curved surface so as to avoid interference with the link connection brackets 11 and 12 of the center frame 10 and the link connection brackets 21 and 22 of the roller frame 20 when the link housing 31 is coupled to the link connection brackets 11 and 12 of the center frame 10 and the link connection brackets 21 and 22 of the roller frame 20, and the coupling holes 33a and 33b are formed to pass through side portions of the link housing 31 so as to receive the plurality of the link connection pins 32a to 32d. These coupling holes are horizontally formed in the longitudinal direction, are at a predetermined distance from each other, and coupled respectively by the link connection pins 32a to 32d to the pair of link connection brackets 11 and 12 which are attached to the side surface of the center frame 10 and the pair of link connection brackets 21 and 22 which are attached to the side surface of the roller frame 20.

Furthermore, a front end portion of the link connection pins 32a to 32d is formed with a coupling groove 32e for fixing the end portion by a snap ring and the like which is not shown so as to prevent a separation of the link connection pins 32a to 32d after connecting the center frame 10 and the roller frame 20 by inserting the link connection pins 32a to 32d after disposing the link housing 31 between the link connection brackets 11 and 12 of the center frame 10 and the link connection brackets 21 and 22 of the roller frame 20. A reference symbol 32f which is not explained denotes a head of the link connection pins 32a to 32d.

The coupling holes 33a and 33b are formed with the inclined surface 34 inclined at a predetermined angle θ in the direction that the link connection pins 32a to 32d are inserted in, i.e. from a center portion of the coupling holes 33a and 33b toward both outside so as to be inclined in the up and down direction of the link housing 31. Preferably, the angle of the inclined surface is greater than 0° and less than or equal to 30°. In other words, a diameter of the center portion of the coupling holes 33a and 33b is small and a diameter of the outside of the inclined surface 34, i.e. both inlet or outlet through which the connection pins 32a to 32d are inserted into or projected to is large. A rotation angle of the roller frame 20, which is made by the link connection pins 32a to 32d coupled to the coupling holes 33a and 33b of the link housing 31 and the inclined surface 34 of the link housing 31 and by which the roller frame 20 is rotated up and down from the longitudinal direction (or the traveling direction), would be greater than 0° and less than or equal to 30°.

FIGS. 7 to 10 are a front view, a plan view, a side view and an operation state view illustrating a movement direction and rotation locking state of the roller frame in the undercarriage system according to the present invention.

In the multi-link bridge of the undercarriage system according to the present invention in which the multi-link bridges 30 are disposed in pairs at upper and lower sides of the link connection brackets 11, 12, 21 and 22 of the center frame 10 and the roller frame 20, the track can maintain the horizontality as shown in FIGS. 7 to 10 even if the roller frame 20 at right in the drawings is moved up as the road surface is uneven. This can be accomplished as the roller frame 20 is moved up independently from the center frame 10 by the multi-link bridge 30 connecting the center frame 10 and the roller frame 20. On the contrary, the right roller frame 20 may be moved down. Like the aforementioned, the roller frame 20 at left in the drawings may be vertically moved in the up and down direction in the same manner by the multi-link bridge 30.

Meanwhile, the roller frame 20 connected to the center frame 10 by the multi-link bridge 30 is pivotable up an down by a predetermined angle as shown as the side views in FIGS. 6 and 9. This is accomplished by the inclined surface 34 of the coupling holes 33a and 33b of the link housing 31 as shown as a cross sectional view in FIG. 5.

In relation to an operation of a state that undercarriage system according to the present invention is assembled, in a case that a load of the vehicle body is transferring to the center frame 10 when driving, the present invention restricts, firstly, a rotation of the roller frame 20 in relation to the center frame 10 around the longitudinal direction the (proceeding direction, refer to FIG. 7) and a rotation of the roller frame 20 in relation to the center frame 10 around the vertical direction the (refer to FIG. 8) and thus prevents an inclination of the vehicle body of an excavator in relation to an obstacle on the road surface so as to be capable of preventing an overturning of the vehicle body and improving operator's feeling of riding.

In addition, secondly, the present invention is capable of preventing a partial wear of the track as the multi-link bridge 30 laterally disposed at the upper and lower portions of the connection portion maintains the roller frame 20 in parallel to the center frame 10 when the roller frame 20 which is independently from the center frame 10 is inclined in the horizontal direction and thus the track comes to contact horizontally with the ground (refer to FIG. 10).

FIG. 11 is a plan view illustrating an undercarriage system according to another feature of the invention and shows a state that the center frame and the roller frames of the undercarriage system are connected by a plurality of the multi-link bridges 30 and 30' and particularly two pair of multi-link bridges are disposed respectively in front and rear sides in this embodiment.

The multi-link bridge is, as described in detail with reference to FIGS. 3 and 4, formed with the link housing having a body of which both side surfaces opposite to the center frame and the roller frame are shaped in a curved surface and coupling holes formed to pass through the body so as to contain the link connection pins and the link connection pins coupled to the coupling holes, and constructed so that an inclined surface with the inclining angle is formed in the inner peripheral surface of the coupling holes along the longitudinal direction of the coupling holes from the center portion of the body toward the outsides and thus the roller frame rotates up and down along the vertical direction and the longitudinal direction.

Therefore, a pitching in the proceeding direction is occurred when one multi-link bridge is used in the center of the roller frame, but the pitching in the front and rear direction can be prevented when two pair of the multi-link bridges 30 and 30' are employed in the front and rear direction as shown in FIG. 11, thereby capable of enhancing the operator's feeling of riding as well as a stability.

In addition, wear of inner peripheral surface of the multi-link bridge and the pin supporting the multi-link bridge gets serious and this causes reduce in durability of the multi-link bridge when one multi-link bridge is disposed in the center of the roller frame, but load applied to each of the multi-link bridges 30 and 30' can be dispersed when two pair of the multi-link bridges 30 and 30' are employed in the front and rear direction as shown in FIG. 11, thereby capable of increasing durability of the multi-link bridge.

In the present invention as described above, the roller frame 20 which is installed at both sides of the center frame 10 is connected by the multi-link bridge 30 to be movable in an up and down direction independently from the center frame 10 and the other side roller frame 20 and an up and down direction along the longitudinal direction of the roller frame 20, and therefore a horizontality of the track can be accomplished, service life of the track can be increased as the partial wear is prevented, a feeling of riding is enhanced as an impact due to the uneven road surface is not transferred directly to the center frame and dangerousness of the overturning can be reduced as the vehicle body is not entirely inclined.

INDUSTRIAL APPLICABILITY

As described above, the present invention employs a link type part in the connection portion connecting the center frame and the roller frame in an undercarriage system and therefore capable of accomplishing effects of increasing the service life of the track by preventing a partial wear as maintaining a horizontality of the vehicle body of the excavator and also capable of improving operator's feeling of riding by stable traveling and thus enhancing working efficiency of the worker and so on.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A multi-link bridge in an undercarriage system, comprising:
   a center frame and a roller frame of the undercarriage system which are designed to move independently from each other;
   link connection brackets installed respectively at opposite side surfaces of the center frame and the roller frame; and
   a link bridge coupled to the link connection brackets, for connecting the center frame and the roller frame; wherein the movement of the roller frame is independent from the center frame in an up and down or vertical direction and a front and rear or longitudinal direction, wherein the link bridge is provided with a link housing having a body of which both side surfaces adjoining the center frame and the roller frame arc shaped in curved surface and two coupling holes which are formed in an inside of the body so as to pass through the body in parallel to each other and contain the connection pin for connecting to the center frame and the roller frame; and the link connection pins which are formed with a diameter enough to be inserted into the coupling holes of the link housing and rotatably couple each of the link connection brackets of the center frame and the roller frame to each of the coupling holes of the link housing, and wherein the coupling hole is formed with an inclined surface having a predetermined angle from a center portion of the housing of the link bridge toward an outside at an inner peripheral surface thereof, thereby enabling the roller frame connected to the center frame to rotates along the longitudinal direction of the frame by the inclined surface.

2. The multi-link bridge in an undercarriage system according to claim 1, wherein the link connection brackets are installed in pairs with a predetermined distance on the opposite side surfaces of the center frame and the roller frame, and at least one pin hole for inserting a connection pin is formed at the corresponding position.

3. The multi-link bridge in an undercarriage system according to claim 2, wherein a plurality of the pin holes are formed with a predetermined distance at upper and lower portion of the each link connection bracket and a plurality of the link bridges is coupled in a laminated structure to each pin hole of the link connection bracket, thereby coupling the center frame and the roller frame in duplicate.

4. The multi-link bridge in an undercarriage system according to claim 1, wherein the inclined surface of the coupling hole has the angle which is greater than 0° and less than or equal to 30°.

5. A multi-link bridge in an undercarriage system, in which
a center frame and roller frames of the undercarriage system are connected by a plurality of link bridges,
the link bridge is provided with a link housing having a body of which both side surfaces opposite the center frame and the roller frame are shaped in curved surface and coupling holes which are formed to pass through the body so as to contain a connection pin and the link connection pin coupled to the coupling hole of the link housing, and
an inclined surface having a predetermined angle along a longitudinal direction of the coupling hole from a center portion of the housing of the link bridge toward an outside is formed at an inner peripheral surface of the coupling hole, thereby enabling the roller frame to rotate in a vertical direction and up and down along the longitudinal direction.

* * * * *